United States Patent [19]

Chadick

[11] 4,079,725
[45] Mar. 21, 1978

[54] SOLAR LADDER

[76] Inventor: Richard E. Chadick, 2741 E. 219th St., Long Beach, Calif. 90810

[21] Appl. No.: 761,872

[22] Filed: Jan. 24, 1977

[51] Int. Cl.$^2$ .................................................. F24J 3/02
[52] U.S. Cl. ..................................... 126/270; 126/271; 237/1 A
[58] Field of Search ................ 126/270, 271; 237/1 A

[56] References Cited

U.S. PATENT DOCUMENTS

| | | | |
|---|---|---|---|
| 3,861,379 | 1/1975 | Anderson, Jr. | 126/270 |
| 3,915,147 | 10/1975 | Rineer | 126/271 |
| 3,996,917 | 12/1976 | Trihey | 126/270 |
| 4,000,734 | 1/1977 | Matlock et al. | 126/271 |
| 4,026,269 | 5/1977 | Stelzer | 126/270 |
| 4,038,972 | 8/1977 | Orrison | 126/271 |

Primary Examiner—John J. Camby
Assistant Examiner—Henry C. Yuen
Attorney, Agent, or Firm—Fulwider, Patton, Rieber, Lee & Utecht

[57] ABSTRACT

Solar ladders are provided in each of which a plurality of parabolic solar reflectors are vertically spaced from each other between a pair of upright support members separated in an east-west direction. Parallelogram linkage on each of the upright supports allows a control rod associated with each support to move in an arcuate path in a vertical plane while maintaining a vertical orientation. Horizontal support bars extending between the vertical control rods adjust the inclination of the parabolic reflectors between a horizontal orientation, to focus the rays of the sun as the sun rises and sets on the horizon, and an elevated orientation during midday. The linkage also maintains horizontal solar energy collectors at the parabolic focus throughout movement of the reflectors. The solar ladder elements can be linked together to operate in unison from a single moving force.

8 Claims, 4 Drawing Figures

SOLAR LADDER

FIELD OF THE INVENTION

The present invention relates to the concentration and collection of solar energy to derive useful power therefrom.

BACKGROUND OF THE INVENTION

In the past, various arrangements of solar energy concentrators have been utilized in attempts to obtain solar energy in useable amounts. The various arrangements have been deficient in that the useable energy output obtained has been insufficient. Consequently, the value of the energy produced has not justified the capital expenditure required for the necessary equipment and land usage. In the prior systems attempted, the desireability of tracking the sun with parabolic reflectors employing a collector at the focus has been recognized. However, the arrangements for the alignment, operation, and movement of the reflectors has been such that only poor results have been obtained.

SUMMARY OF THE INVENTION

It is an object of the present invention to provide an arrangement of parabolic reflectors that maximizes the number of reflectors that can be deployed within a given land area. In the past, arrays of reflectors in which individual reflectors were vertically separated, also involved a substantial horizontal separation. The ostensible purpose of horizontal separation is to prevent the uppermost reflectors from casting shadows on the lower reflectors. However, according to the present invention, appropriate vertical spacing of individual reflectors allows the reflectors to be vertically spaced from each other without horizontal displacement. This reduces significantly the land area required to mount a specified number of reflectors and hence obtain the efficient production of solar energy from a given land area. By locating the reflectors according to the present invention, it must be recognized that the greatest utility of the claimed invention is in Temperate and Arctic Geographic Zones. However, it is a fact that these are the geographic areas in which additional sources of energy are most urgently needed. Hence the invention not only provides increased efficiency and energy production, but maximizes this increased efficiency in areas where it is needed most.

A further object of the invention is to provide a means for concurrently orienting a plurality of reflectors to track the sun using a single moving source. By locking the movement of vertically reflectors together this objective is achieved. Moreover, by means of the unique mechanical interconnection of the elements of the invention, the solar collectors are maintained in position at the focuses of the parabolic reflectors by the same movement that adjusts the orientation of the reflectors themselves. Furthermore, interconnection of the moving linkage between adjacent solar ladders allows a force applied at a single location in an array of solar ladders to be transmitted to all of the associated reflectors and collectors in all of the solar ladders and hence to achieve uniform movement from a single application of force. This minimizes maintenance difficulties and decreases the overall energy consumed orienting the reflectors.

A related object of the invention is to provide flexibility in the design of arrays of the solar ladders. More specifically, because of the unique manner of interconnection of the movement of the reflectors and collectors, fields of solar ladders of modular design are possible. That is, a particular array of solar ladders may be constructed to meet a particular energy requirement. If that requirement increases, it is possible according to the apparatus of the present invention to merely add modular members to increase the capability of the array, without unduly increasing the required land area and without adding to the equipment necessary to effectuate tracking at all.

For all of the foregoing reasons, the present invention contributes to a satisfactory solution of the problem of pressing need for more and more power. Because of the flexibility of power storage and distribution inherent in the use of electrical energy, the preferred embodiment of the invention involves the conversion of heat concentrated in the collectors to electrical energy, followed by the storage or transmission of that electrical energy to points of need.

DESCRIPTION OF THE DRAWINGS

The present invention may be described with greater particularly and specificity by reference to the accompanying drawings in which.

DETAILED DESCRIPTION

Figure 1:
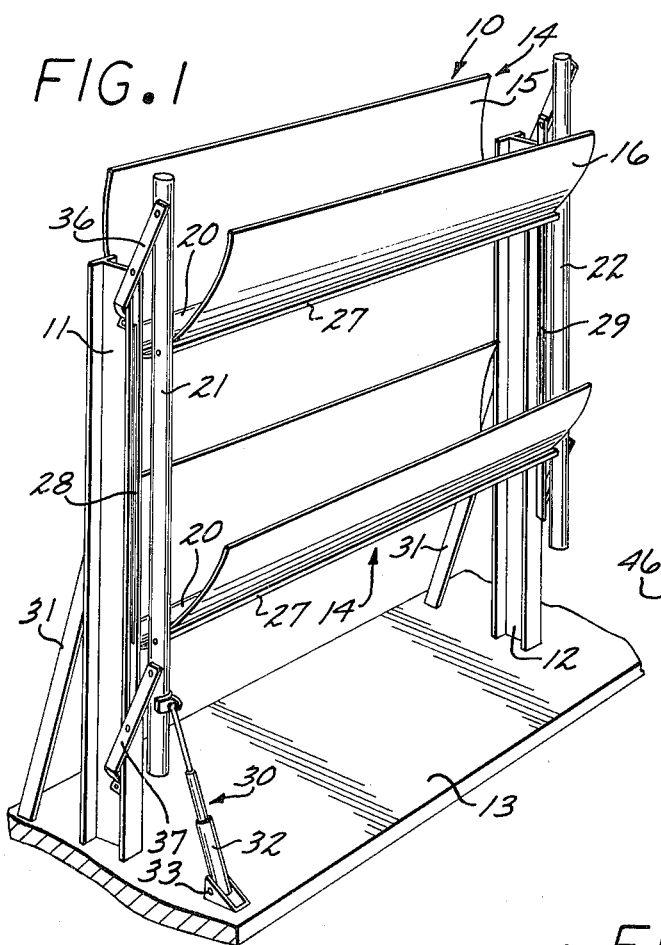
FIG. 1 is a perspective view of a single solar energy ladder according to the invention.
Figure 3:
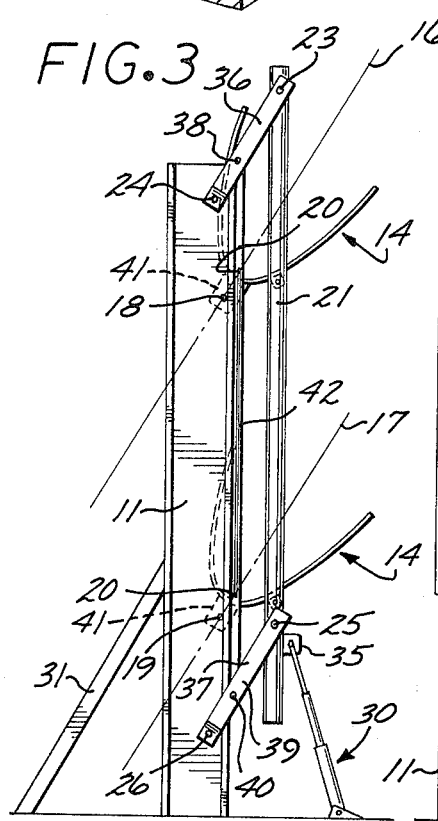
FIG. 3 is a side elevational view of the solar ladder of FIG. 1.

As illustrated in FIG. 1, a single solar ladder 10 is provided with a pair of upright support members 11 and 12 mounted on a horizontal pad 13 and spaced from each other in an east-west direction. The upright members 11 and 12 are preferably I-beams with the webs of the I-beams oriented in a north-south direction and with the flanges oriented in an east-west direction. A plurality of parabolic solar reflectors 14 are mounted on the supports 11 and 12 and are spaced in vertical alignment. Each reflector 14 has a concave surface 15 and a convex surface 16 as well as a focus. Each reflector 14 is symmetrically aligned about a plane extending in an east-west direction and passing through the focus and inclined to a variable degree toward the earth's equator. For example, the two reflectors 14 in FIG. 3 are bisected and oriented in mirror image, one each about the planes 16 and 17. The reflectors 14 are carried between the upright support members 11 and 12 and are mounted thereto at horizontal mounting axes 18 and 19.

A longitudinal horizontal solar energy collector 20 is positioned at the focus of each of the parabolic reflectors 14. Vertically oriented control rods 21 and 22 are displaced towards the earth's equator relative to the upright support members 11 and 12. Each control rod is formed of hollow aluminum or steel tubing about 6 inches in diameter, and is located proximate to an upright support member. Each control rod 21, 22, has upper rotatable connections 23 and 24 and lower rotatable connections 25 and 26 to an adjacent upright support member 11 or 12. The control rods 21 and 22 thereby move in translation in an arcuate path relative to the upright supports 11 and 12 with which they are associated, all the while maintaining a vertical orientation.

Horizontal support bars 27 extend laterally between each pair of control rods 21 and 22 to support the reflectors 14 in rotational movement about the mounting axes 18 and 19. The convex surfaces 16 of the reflectors 14 thereby ride upon the support bars 27 as the control rods 21 and 22 move in their arcuate paths.

Vertical guide arms 28 and 29 are provided, and each guide arm is associated with a control rod 21 or 22 and is coupled to move in tandem therewith. The vertical guide arms 28 and 29 carry the solar energy collectors 20. An actuating mechanism in the form of a hydraulic cylinder assembly 30 is provided for moving the control rods 21 and 22 in their arcuate paths to track the sun to orient the reflectors and capture and concentrate the rays of the sun at the collectors 20 located at the parabolic focuses. By virtue of their connection to the control rods, the guide arms 28 and 29 continually maintain the solar energy collectors 20 at the parabolic focuses of the reflectors 14.

As is apparent from the drawings, braces 31 are provided to stabilize the upright I-beam supports 11 and 12. The lower or cylinder end 32 of the hydraulic cylinder 30 is anchored to the pad 13 and is rotable relative thereto at the pivot 33. The piston portion 34 of the hydraulic cylinder 30 is connected to an angle 35 located near the lower extremity of the control rod 21. The piston 34 is likewise rotably joined to the angle 35 which in turn is welded or otherwise immovably fixed relative to the control rod 21.

The linkage of the invention also includes upper and lower connecting links 36 and 37 respectively. The connecting links 36 and 37 are of equal length and join each of the control rods 21 and 22 to an associated upright support 11 or 12, which is proximately located thereto. The connecting links 36 and 37 along with a control rod and an upright support form parallelogram linkage for elevating the control rod as the sun rises above the horizon in the forenoon. Similarly, the parallelogram linkage lowers the control rod as the sun drops towards the horizon in the afternoon. The upper connecting links 36 form rotatable connections at the control rods 21 and 22 by virtue of the swivel pins 23. Similar rotatable connections are formed by the upper connecting links 36 with the guide arms by swivel pins 38. Corresponding swivel connections are provided at the lower links 37 with respect to the control rods and guide arms at swivel pins 25 and 40 respectively. In a similar manner the connecting links 36 and 37 are attached to the I-beams 11 and 12 by swivel connections 24 and 26 respectively. It should be noted that the shape of the connecting links 36 and 37 is that of an S or Z-shape since the arms of these connecting links must clear the flanges of the I-beams 11 and 12.

Mounting braces 41 are provided at opposing ends of each of the parabolic reflectors 14 to extend from the vertices of the parabolic reflectors along the axes of symmetry. Swivel pins at 18 and 19 connect the mounting braces 41 to the upright supports 11 and 12. The reflectors 14 are thereby rotatably mounted at the axis 18 and 19 by the mounting braces 41. Preferably, the mounting axes 18 and 19 are in vertical alignment with the rotatable connections 24 and 26 joining the connecting links 36 and 37 to the upright supports 11 and 12.

Figure 4:
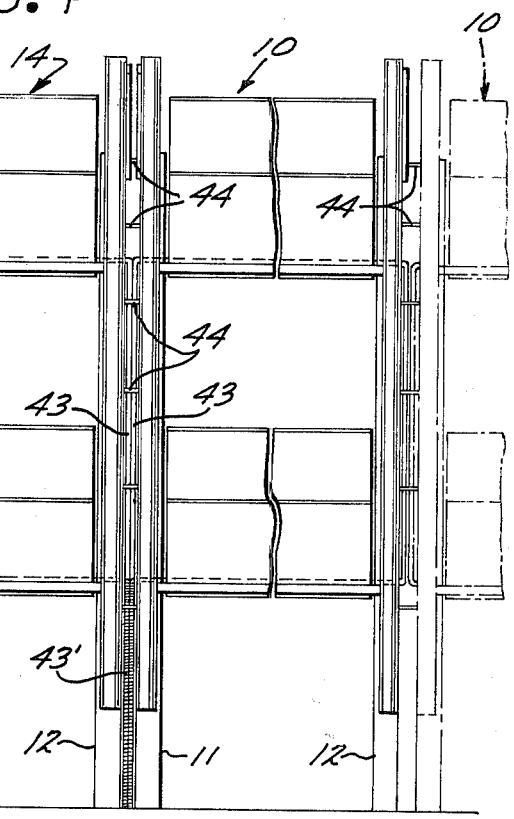
FIG. 4 is a front elevational view of a portion of the array of solar ladders of FIG. 2.

The solar energy collectors 20 include rigid hollow tubing aligned along the focuses of the parabolic reflectors 14 for carrying a fluid heat transfer medium. Apertures are defined in the vertical guide arms 28 at the focuses of the reflectors 14 and the fluid transfer tubes pass through these apertures. The collectors 20 are joined at one end by a duct 42 to provide a path of fluid communication between the collectors associated with all of the vertically displaced reflectors 14 carried between a single pair of upright support members 11 and 12. As is depicted in FIG. 4, the opposite ends of the collectors 20 are joined together by rigid tubing 43, but have a flexible joint or tubing segment 43' at their outlets. The flexible tubing segments 43' connect the rigid sections of tubing to a heat sink indicated by the dotted connection lines 45 in FIG. 2. The use of flexible tubing segments 43' allows vertical movement of the focuses of the parabolic reflectors 14.

The operation of the solar ladder is most easily explained with reference to FIG. 3. FIG. 3 is an elevational view in an east or west direction. In the northern hemisphere, the view of FIG. 3 is toward the east, while in the southern hemisphere the view is toward the west. It can be seen that all of the reflectors 14 are inclined toward the equator in either event. The reflectors would initially begin cyclic movement with their concave surfaces 15 facing the horizon so that the planes of symmetry bisecting each of the parabolic reflectors 14 would not be upwardly inclined, as at 16 and 17 in FIG. 3, but rather would be exactly horizontal. As the sun rises in the east, the hydraulic cylinder 30 is actuated to force the control rods 20 upward and rearward in arcuate rotation about the pivot points 24 and 26. Actuation of the hydraulic cylinder 30 is in synchronization with the rise of the sun above the horizon, which of course, varies with the latitude and time of year.

At the middle of the solar day, the inclination of the reflectors 14 would be that depicted in FIG. 3, so that the planes of symmetry 16 and 17 of the reflectors 14 would be at the maximum angle with respect to the earth's surface for the latitude and time of year. The invention is designed to operate up to a maximum inclination of 60° so that it is apparent that the invention finds its greatest utility outside of the Torrid Zone of the earth in the Temperate and Arctic Zones. Near the equator, it would be necessary for the planes of symmetry 16 and 17 to approach or reach a vertical orientation which would cause shadows from the upper reflectors 14 to obscure the lower reflectors, thus markedly impairing the efficiency of operation of the invention. For this reason it can be seen that the solar ladder is most effectively used in those regions of the earth where the sun infrequently rises no higher than 60° above the horizon. Of course, these are the regions of the world where the greatest energy need currently exists.

A further feature of the invention is the modular aspect of the solar ladders. Each of the solar ladders may be positioned side by side and aligned in an east-west direction as indicated in FIG. 4. Each pair of support members 11 and 12 carries a plurality of vertically spaced reflectors 14 as previously indicated. In addition, lateral links 44 are provided to interconnect interiorally located control rods 21 and 22 of adjacent solar ladders 10. In this way the lateral links 44 interconnect all of the control rods 21 and 22 to cause all of them to move in unison.

Figure 2:
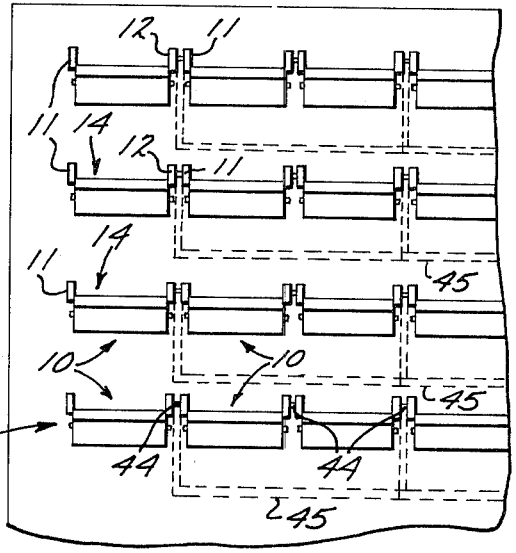
FIG. 2 is a plan view of an array of solar ladder

A matrix arrangement of solar ladders 10 is depicted in FIG. 2. In this diagram, a plurality of pairs of the upright support members 11 and 12 are positioned side by side to form a rank of solar energy ladders 10 aligned in an east-west direction. Such a rank is indicated generally at 46 by the lower horizontal row of solar ladders 10 in FIG. 2. The lateral locking links 44 interconnect the interior control rods 21 and 20, as in FIG. 4, to cause all of the reflectors 14 in the rank to move synchronously. Additional pairs of upright support members 11 and 12 with reflectors 14 mounted thereon are provided and are uniformly spaced in a north-south direction from corresponding ones of the solar ladders 10 in the rank 45 in FIG. 2. Thus, the array of solar ladders 10 depicted forms a rectilinear matrix. It should be noted that the minimum north-south distance between adjacent ranks of the solar ladders should be at least twice the height of each solar ladder. That is, the minimum distance should be twice the height of the upper extremity of the control rods 21 and 22 when the control rods are in the extended positions of FIG. 3.

From FIG. 2 it can be seen that utilization of the solar ladders 10 in the matrix array indicated is an extremely efficient use of available land. The individual reflectors 14 can be stacked to virtually any height provided that a sufficient distance between ranks of the structures in a north-south direction is provided.

It should be understood that the foregoing illustrations of the embodiment and arrangement of the structures of the invention have been chosen for illustrative purposes only, and no unnecessary limitations should construed therefrom. Rather, the invention is defined in the claims appended hereto.

I claim:

1. A solar energy concentrating apparatus comprising:
    a pair of upright support members spaced apart from each other in an east-west direction;
    a plurality of parabolic solar reflectors spaced in vertical alignment, each having concave and convex surfaces and a focus and each being symmetrically aligned about a plane extending in an east-west direction and passing through said focus and inclined to a variable degree toward the earth's equator, said reflectors being carried between said upright support members and rotatably mounted relative thereto about mounting axes;
    a longitudinal horizontal solar energy collector means positioned at the focus of each of said parabolic reflectors;
    vertically oriented control rods displaced toward the earth's equator relative to said upright support members and proximate thereto, each control rod having upper and lower rotatable connections to an adjacent upright support member, whereby said control rods move in translation in arcuate paths relative to said upright supports while maintaining a vertical orientation,
    horizontal support bars extending laterally between ones of said control rods to support said reflectors in rotational movement about said mounting axes, whereby said convex surfaces of said reflectors ride upon said support bars as said control rods move in their arcuate paths,
    a vertical guide arm associated with each control rod and coupled to move in tandem therewith, and said vertical guide arms carry said solar energy collector means, upper and lower connecting links of equal length joining each control rod to approximately located upright support, thereby forming parallelogram linkage for elevating said control rod, and
    actuating means for moving said control rods in said arcuate paths to track the sun to orient said reflectors to capture and concentrate the rays of the sun at said focuses, whereby said guide arms continually maintain said solar energy collector means at said focuses.

2. The apparatus of claim 1 further characterized in that a plurality of pairs of said upright support members are positioned side by side aligned in an east-west direction, each pair of support members carrying a plurality of vertically spaced reflectors as aforesaid, and further comprising lateral linking means interconnecting ones of said control rods to cause all of said control rods to move in unison.

3. The apparatus of claim 1 further characterized in that a plurality of pairs of said upright support members are positioned side by side to form a rank of solar energy ladders aligned in an east west direction, and lateral linking means interconnect ones of said control rods to cause all of the reflectors of said rank to move synchronously, and additional pairs of said upright support members with reflectors mounted thereon are provided and are uniformly spaced in a north-south direction from corresponding ones of said pairs in the aforesaid rank, thereby forming a rectilinear matrix of solar energy ladders.

4. The apparatus of claim 3 further characterized in that said uniform spacing in a north-south direction is at least twice the height of a solar ladder.

5. The apparatus of claim 1 further characterized in that said connecting links form rotatable connections at said control rods, at said upright supports, and at said guide arms, and mounting braces extend from the vertices of said parabolic reflectors along the axes of symmetry thereof, and said reflectors are rotatably connected to said upright supports at said mounting axes by means of said mounting braces, and said mounting axes are in vertical alignment with said rotatable connections of said connecting links to said upright support members.

6. The apparatus of claim 1 further characterized in that said actuating means is comprised of a hydraulic cylinder having one end anchored relative to the earth's surface and having another end coupled to one of said control rods.

7. The apparatus of claim 1 further characterized in that said solar energy collection means comprises sections of rigid hollow tubing carrying a fluid heat transfer medium, and flexible tubing segments connect said rigid sections of tubing to a heat sink.

8. The apparatus of claim 7 further characterized in that apertures are defined in said vertical guide arms at the focuses of said parabolic reflectors, and fluid transfer tubes pass through said apertures and provide a path of fluid communication between the solar energy collection means associated with all of the vertically displaced reflectors carried between a single pair of said upright support members.

* * * * *